Aug. 10, 1965    H. S. HARRISON    3,199,657
LIVE ROLLER CONVEYOR
Filed Aug. 5, 1963    6 Sheets-Sheet 1
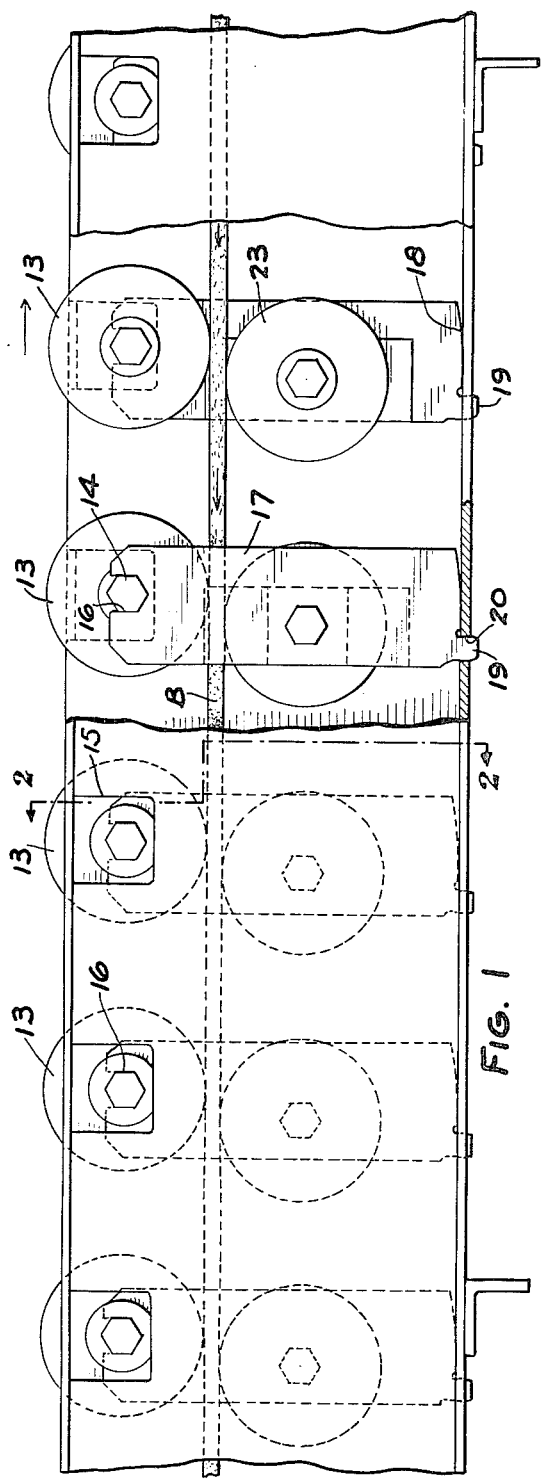
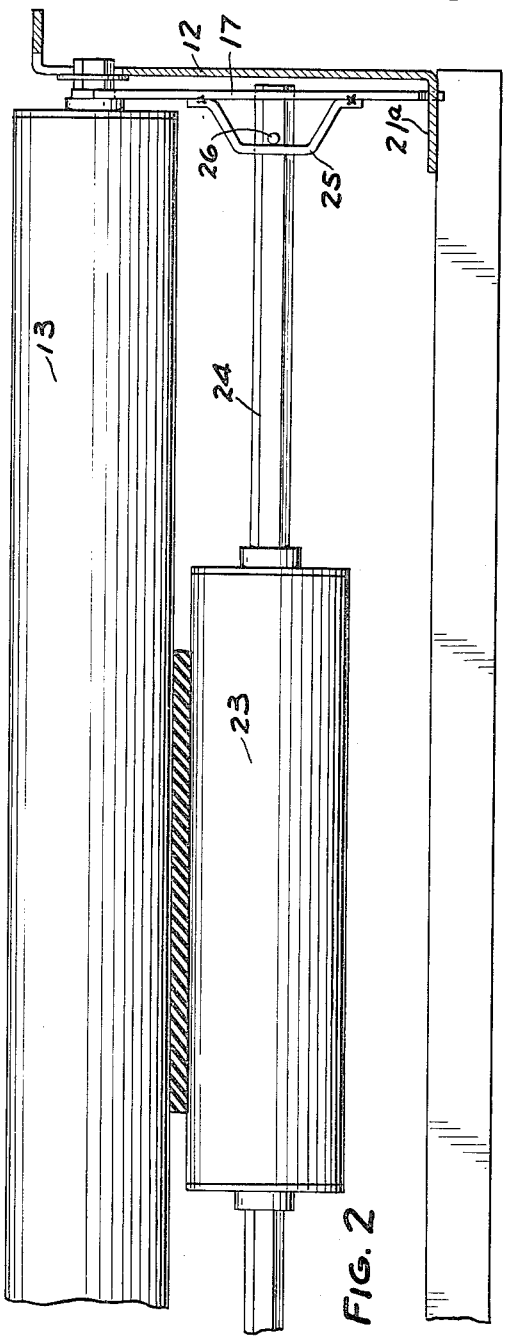
INVENTOR.
HOMER S. HARRISON
BY
Barnes, Kisselle, Raisch & Choate
ATTORNEYS

INVENTOR.
HOMER S. HARRISON

Aug. 10, 1965
H. S. HARRISON
3,199,657
LIVE ROLLER CONVEYOR
Filed Aug. 5, 1963
6 Sheets-Sheet 3
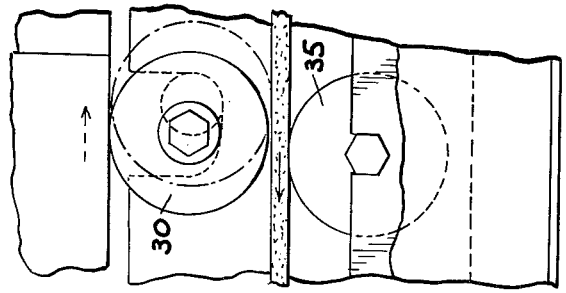
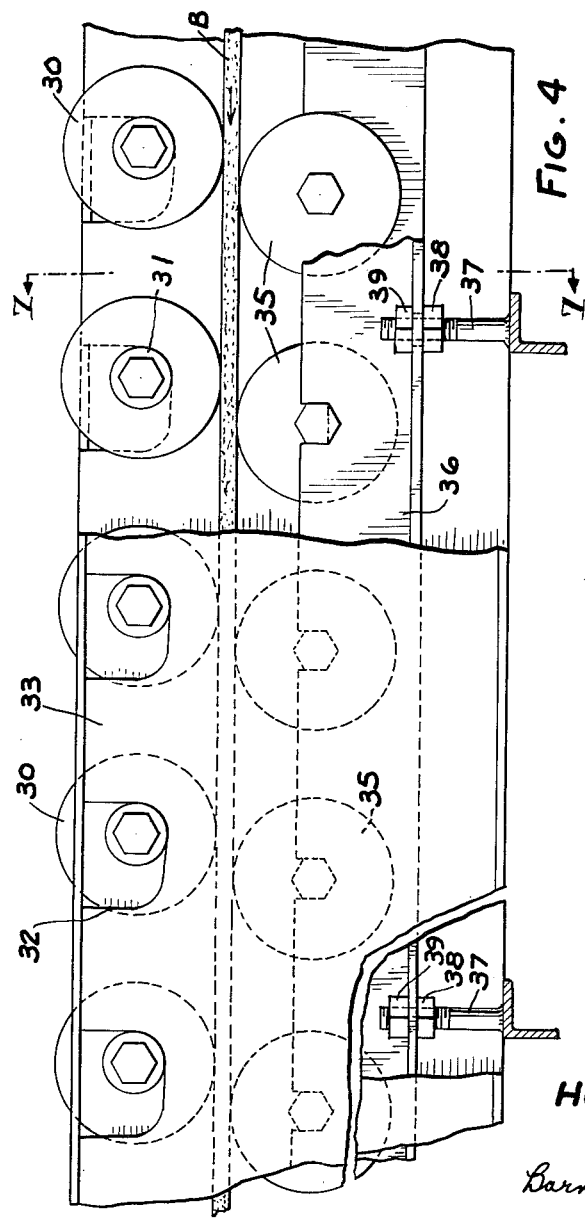
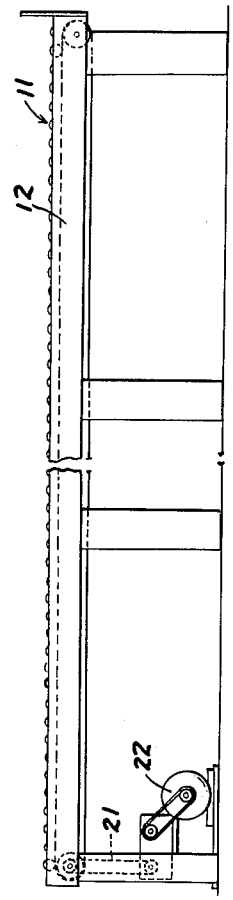
INVENTOR.
HOMER S. HARRISON
BY
*Barnes, Kisselle, Raisch & Choate*
ATTORNEYS Aug. 10, 1965     H. S. HARRISON     3,199,657
LIVE ROLLER CONVEYOR
Filed Aug. 5, 1963     6 Sheets-Sheet 4
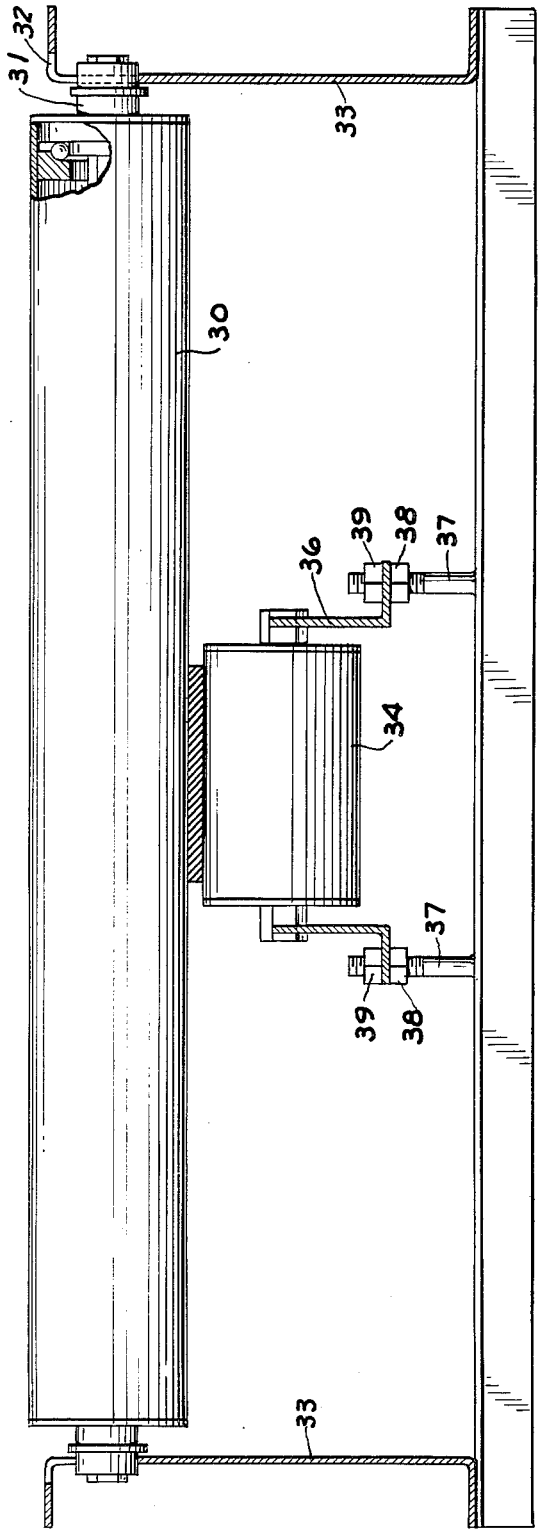
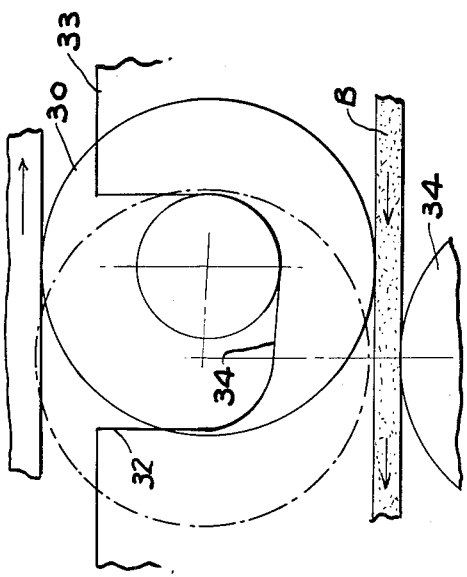
FIG. 7
FIG. 8
INVENTOR.
HOMER S. HARRISON
BY
Barnes, Kisselle, Raisch & Choate
ATTORNEYS

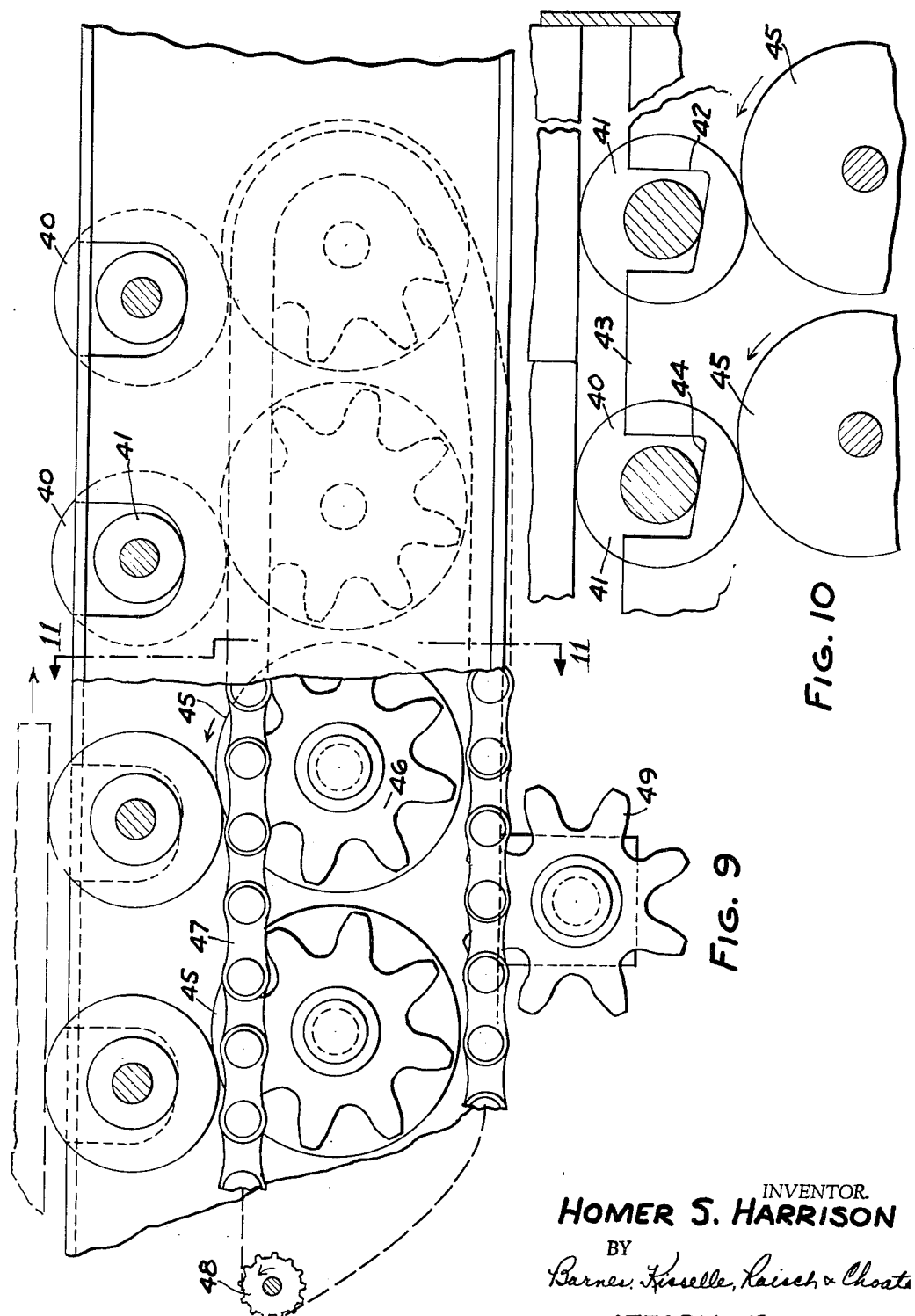

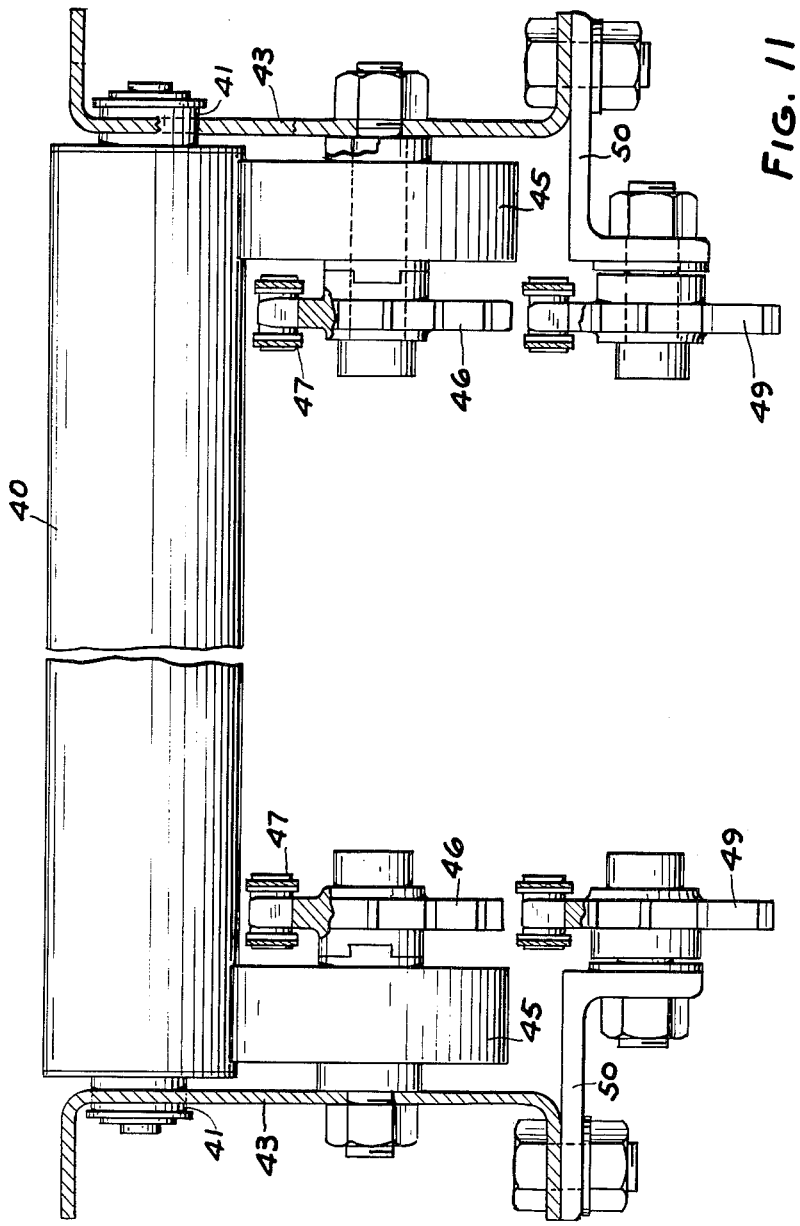

United States Patent Office 3,199,657
Patented Aug. 10, 1965

3,199,657
LIVE ROLLER CONVEYOR
Homer S. Harrison, Detroit, Mich., assignor to Mechanical Handling Systems, Inc., Detroit, Mich., a corporation of Michigan
Filed Aug. 5, 1963, Ser. No. 299,856
12 Claims. (Cl. 198—127)

This invention relates to live roller conveyors.

At the present time, live roller conveyors comprise a main frame on which a plurality of spaced conveyor rollers are mounted for rotation with their axes extending transversely. The rollers are driven continuously by an endless belt which is positioned beneath the rollers and a reach thereof is held in engagement with the conveyor rollers by pressure rollers. In order to prevent damage to the articles being conveyed when the articles have their movement momentarily interrupted on the conveyor, it is desirable to disengage the driving connection between the belt and the conveyor rollers.

It is an object of this invention to provide a live roller conveyor wherein the driving connection to the conveyor rolls is interrupted when the movement of the articles being conveyed is stopped.

It is a further object of this invention to provide such a live roller conveyor which is relatively simple and utilizes a minimum number of parts.

It is a further object of the invention to provide such a live roller conveyor which can be manufactured at low cost.

It is a further object of the invention to provide such a live roller conveyor which obviates the need for an endless drive belt.

In the drawings:

FIG. 1 is a fragmentary part sectional side elevational view of a live roller conveyor embodying the invention.

FIG. 2 is a fragmentary sectional view taken along the line 2—2 in FIG. 1.

FIG. 4 is a fragmentary part sectional side elevation of a modified form of live roller conveyor.

FIG. 5 is a fragmentary sectional view of a portion of the apparatus shown in FIG. 4 showing the parts in a different operative position.

FIG. 6 is a fragmentary side elevation of a live roller conveyor embodying the invention.

FIG. 7 is a fragmentary sectional view taken along the line 7—7 in FIG. 4.

FIG. 8 is a fragmentary sectional view on an enlarged scale of a portion of the apparatus shown in FIG. 4.

FIG. 9 is a fragmentary part sectional side elevation of a further modified form of live roller conveyor.

FIG. 10 is a fragmentary view similar to FIG. 9, parts being broken away.

FIG. 11 is a fragmentary sectional view taken along the lines 11—11 in FIG. 9.

Figure 3:
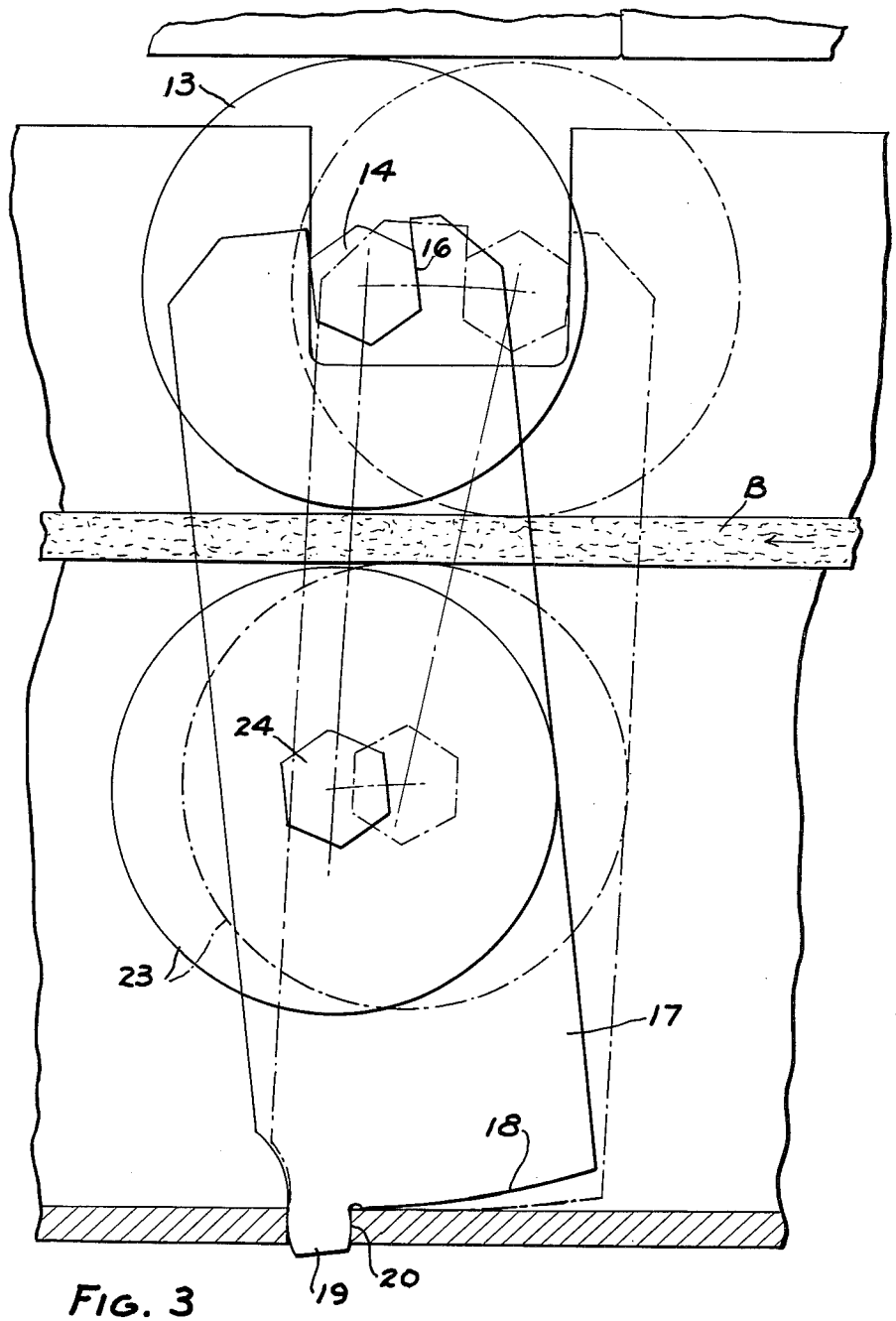
FIG. 3 is a fragmentary sectional view on an enlarged scale of a portion of the conveyor shown in FIGS. 1 and 2.

Referring to FIGS. 1, 2 and 6, the live roller conveyor 10 embodying the invention comprises a main frame 11 consisting of side rails 12 extending longitudinally of the conveyor. A plurality of transverse conveyor rollers 13 are provided at longitudinally spaced points on the side rail. Each conveyor roller 13 includes a shaft 14 which extends through openings 15 in the side rails 12.

The ends of the shafts are hexagonal and are mounted in slots 16 in the ends of arms 17. Each arm 17 is made of sheet metal and has the lower end thereof curved in the form of an arc as at 18 and formed with a projecting tab 19 along the lower rear edge thereof. Tab 19 extends into an opening 20 in a flange 21a on the side rail 12. An endless belt B is provided beneath the conveyor roller 13 and is driven by a linkage 21 to a motor 22. Pressure rollers 23 are journalled on hexagonal shafts 24 that have their ends fixed in openings in the arms 17 and held in position therein by brackets 25 and a pin 26 that extends diametrally through the end of the shaft and prevents the shaft from moving out of the bracket and arm.

Each shaft 24 is mounted such that its axis is parallel and spaced rearwardly from the axis of the roller 13. Thus, as shown in solid lines in FIG. 1 and broken lines in FIG. 3, in a normal position the arms 17 are generally vertical resting on the arcuate surface 18 with the axis of the conveyor roller 13 forwardly of the vertical centerline of the arm 17 and the axis of the pressure roller 23 rearwardly of the centerline of the arm 17. In this position, pressure rollers 23 hold the belt B in driving engagement with the rollers 13. Thus, as shown in FIG. 1, as the belt B moves to the left, the rollers 13 are rotated clockwise tending to move the load to the right.

In the event that the load is interrupted in its movement, as by an obstruction or other means, the conveyor rollers 13, which engage the underside of the load, tend to move and continue to rotate in a clockwise manner. Since the load cannot move, the rollers 13 track beneath the load and tend to move to the left. This causes the arms 17 to swing in a counterclockwise direction, as viewed in FIGS. 1 and 3. Since the center of curvature of the end 18 of arm 17 is rearward of the axis of roller 13, this movement of arms 17 tends to swing the rollers 13 upwardly away from the belt B so that the conveyor rollers 13 move out of driving engagement with the belt B. At the same time, the pressure rollers 23, being rearward of the center of arc 18 and arm 17, are swung counterclockwise moving their axes downwardly and rearwardly of the conveyor so that the pressure rollers 23 also move out of engagement with the belt B. As a result, the drive to the conveyor rollers 13 is completely interrupted.

When the obstacle to movement of the load along the conveyor is removed, the weight of the conveyor roller 13 tends to swing the arm 17 forwardly so the conveyor rollers 13 and, in turn, the pressure rollers 23 are moved to their original position wherein the pressure rollers 23 hold the belt B in driving engagement with the conveyor rollers 13. In this manner, each of the conveyor rollers 13 is mounted for movement into and out of driving engagement with the belt B.

In the form of the invention shown in FIGS. 4, 5, 7 and 8, each conveyor roller 30 is mounted with an enlarged end or bushing on the shaft 31 engaging the bottom of slots 32 in the side frames 33. Each slot 32 has its bottom surface 34 inclined upwardly and rearwardly. The pressure rollers 35 are rotatably mounted in a support 36 that is adjustably positioned beneath the belt B by screws 37 and nuts 38, 39.

In this form of the invention, when the upper reach of the belt B is driven to the left as shown in FIG. 4, the conveyor rollers are in engagement with the belt and are rotated clockwise to move the load to the right as shown in FIG. 4. In the event that the movement of the load is interrupted, the conveyor rollers 30 underlying the load tend to track along the underside of the load and move to the left. Since the shafts 31 on which the rollers 30 are mounted are in engagement with the inclined bottom surface 34 of each slot 32, the conveyor rollers 30 will move upwardly and rearwardly due to this tracking action so that the conveyor rollers 30 will move out of driving engagement with the belt B (FIG. 8).

When the obstacle to the movement of the load is removed, the weight of the rollers 30 will permit the rollers 30 to move forwardly down the inclined surfaces 34 to positions wherein they are again drivingly engaged by the belt B.

In the form of the invention shown in FIGS. 9, 10 and 11, each conveyor roller 40 is mounted with the enlarged end or bushing on the shaft 41 engaging the bottom of slots 42 in the side frame 43. Each slot has its bottom surface 44 inclined upwardly and rearwardly. Instead of having an endless drive belt for driving the conveyor roller 40, each of the rollers is provided with a pair of rubber drive rollers 45 that are journalled on the sides 43 with their axes forwardly and parallel to the axes of their corresponding rollers 40. A nylon sprocket 46 is keyed to each roller 45 and a chain 47 is trained over the sprocket 46 of the successive rollers 45 and driven by a drive sprocket 48, shown diagrammatically in FIG. 9, to drive the drive roller and, in turn, the conveyor roller 40 in synchronism. Chains 47 are driven in synchronism to drive rollers 45 in synchronism. Idler sprockets 49 are journalled on brackets 50 mounted on the frame and engage the lower reach of the chain 47 at suitable points along the length of the chain as may be required.

As in the form of the inventioin shown in FIGS. 4, 5, 7 and 8, when the movement of the load is interrupted, the conveyor rollers 40 underlying the load tend to track along the underside of the load and move to the left, as shown in FIG. 10. Since the shafts 41 on which the rollers 40 are mounted are in engagement with the inclined bottom surfaces 44 of slots 42, the conveyor rollers 40 will move upwardly and rearwardly due to this tracking action so that the conveyor rollers 40 will move out of driving engagement with their respective drive rollers 45.

When the obstacle to movement of the load is removed, the weight of the conveyor rollers 40 will permit the conveyor rollers 40 to move forwardly down the inclined surfaces 44 to positions where they are again drivingly engaging the drive rollers 45.

It can thus be seen that there has been provided a live roller conveyor which effectively interrupts driving engagement with the load when the movement of the load is stopped, which is relatively simple and utilizes a minimum number of parts, and which is low in cost. In the form of the invention shown in FIGS. 99-11, the use of an endless drive belt is completely eliminated.

I claim:

1. In a live roller conveyor, the combination comprising a frame,
a plurality of conveyor rollers,
means for rotatably supporting each said conveyor roller in said frame with its axis extending transversely of said frame and movable upwardly and rearwardly,
each said conveyor roller normally positioned downwardly and forwardly of the frame,
means for frictionally engaging said conveyor rollers adjacent the underside for driving the conveyor rollers,
such that when a load is interrupted in its movement along said conveyor rollers, the conveyor rollers under said load are caused to move upwardly and rearwardly by tracking engagement with the underside of the load out of driving engagement with said engaging and driving means thereby interrupting rotation of said conveyor rollers under said load.

2. The combination set forth in claim 1 wherein said means for supporting each said conveyor roller comprises an opposed pair of slots in said frame,
each said slot having a surface inclined upwardly and rearwardly,
and each said conveyor roller having end portions thereof extending into bearing engagement with said inclined surfaces of one said pair of slots.

3. In a live roller conveyor, the combination comprising a frame,
a plurality of conveyor rollers,
means for rotatably supporting each said conveyor roller in said frame with its axis extending transversely of said frame and movable upwardly and rearwardly,
each said conveyor roller normally positioned downwardly and forwardly of the frame,
a plurality of drive rollers rotatably mounted on said frame with their axes extending transversely and the drive rollers normally engaging said conveyor rollers,
means for rotating said drive rollers to normally drive said conveyor rollers and thereby move a load thereon along the conveyor,
such that when a load is interrupted in its movement along said conveyor rollers, said conveyor rollers are moved upwardly and rearwardly by tracking engagement with the underside of the load out of driving engagement with the drive rollers so that the conveyor rollers beneath the load are not rotated.

4. The combination set forth in claim 3 wherein said means for driving said drive rollers comprises a sprocket on each said drive roller and an endless chain trained over said sprocket.

5. The combination set forth in claim 3 wherein a drive roller is provided for each said conveyor roller and the axis of each drive roller is spaced forwardly of the axis of its corresponding conveyor roller.

6. The combination set forth in claim 5 wherein said means for supporting each said conveyor roller comprises an opposed pair of slots in said frame,
each said slot having a surface inclined upwardly and rearwardly,
and each said conveyor roller having end portions thereof extending into bearing engagement with said inclined surfaces of one said pair of slots.

7. In a live roller conveyor, the combination comprising a frame,
a plurality of conveyor rollers,
means for rotatably supporting each said conveyor roller in said frame with its axis extending transversely of said frame and movable upwardly and rearwardly,
each said conveyor roller normally positioned downwardly and forwardly of the frame,
a driven belt having a reach thereof extending beneath said conveyor rollers,
a plurality of pressure rollers mounted on said frame beneath said belt and normally urging said belt against said conveyor rollers,
such that when a load being conveyed by said conveyor rollers is interrupted in its movement thereon, said conveyor rollers under said load are moved upwardly and rearwardly by tracking engagement with the underside of a load and thereby move out of driving engagement with said belt.

8. The combination set forth in claim 7 wherein a pressure roller is provided beneath each said conveyor roller, the axis of each said pressure roller being rearwardly of the axis of its respective conveyor roller.

9. In a live roller conveyor, the combination comprising a frame,
a plurality of conveyor rollers,
a pair of arms associated with each said conveyor roller and pivoted to said frame,
a conveyor roller rotatably mounted between said arms with its axis extending transversely of the frame,
a pressure roller journalled between said arms,
a driven belt having a reach thereof extending between said conveyor rollers and said pressure rollers,
said pivot axis of said arms being beneath said belt,
said arms being adapted to swing so that the conveyor roller thereon moves downwardly and forwardly into engagement with the belt and upwardly and rearwardly out of driving engagement with the belt and the pressure roller between said arms moves upwardly and forwardly into engagement with said belt and downwardly and rearwardly out of engagement with the belt,
said pressure roller tending to counter balance the weight of said conveyor roller, such that when the movement of a load by said conveyor rollers is interrupted, said conveyor rollers under the load move upwardly and rearwardly by tracking engagement with the underside of the load, swinging the arms and simultaneously moving the pressure rollers downwardly and rearwardly out of engagement with the belt so that rotation of the conveyor rollers under the load is interrupted.

10. The combination set forth in claim 9 wherein the pivot to each said arm to said frame comprises an arcuate surface on the lower end of each said arm and a corresponding flat surface on said frame with which said arcuate surface of said arm is engaged.

11. The combination set forth in claim 10 including a tab on the lower end of each said arm,
   said frame having its corresponding opening therein into which said tab extends.

12. In a live roller conveyor, the combination comprising
   a frame,
   a plurality of conveyor rollers,
   said frame having a plurality of opposed pairs of slots therein,
   each said slot having a surface extending upwardly and rearwardly,
   each said conveyor roller having end portions thereof extending into bearing engagement with said inclined surfaces of one said pair of slots,
   a driven belt having a reach thereof beneath said conveyor rollers,
   a plurality of pressure rollers journalled on said frame with their axes extending transversely beneath said belt,
   such that when a load being moved by said conveyor rollers is interrupted in its movement thereon, said conveyor rollers under said load are moved upwardly and rearwardly along said inclined surfaces by tracking engagement with the underside of the load so that the conveyor rollers are moved out of driving engagement with the belt.

References Cited by the Examiner

UNITED STATES PATENTS

| | | | |
|---|---|---|---|
| 3,012,652 | 12/61 | Poel | 198—127 |
| 3,116,823 | 1/64 | Schneider | 198—127 |

SAMUEL F. COLEMAN, *Primary Examiner.*

WILLIAM B. LA BORDE, *Examiner.*